Jan. 2, 1923.
O. SODERSTROM.
MACHINE FOR CUTTING LINK MESH.
FILED JUNE 8, 1921.
1,440,845.
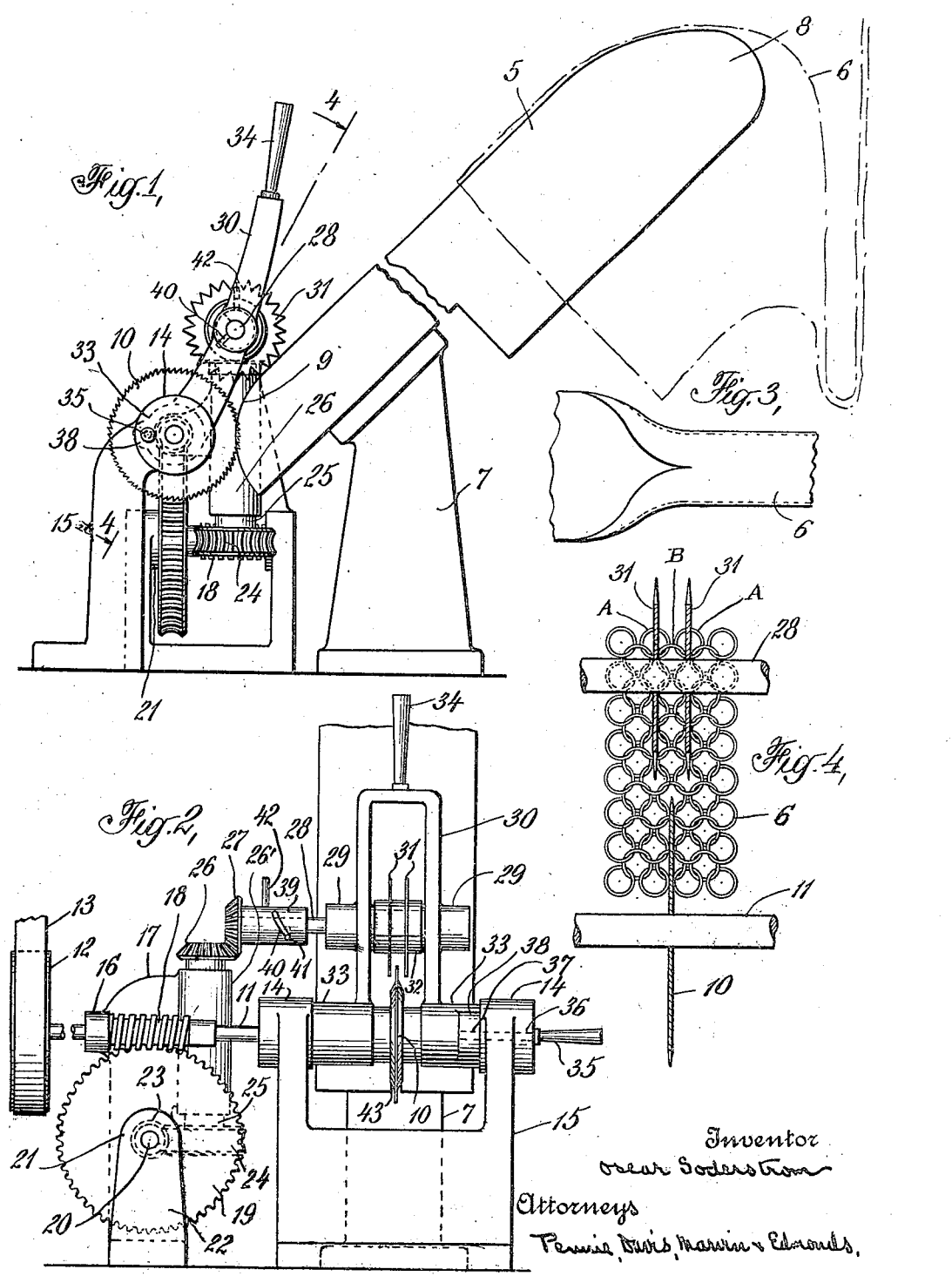

Patented Jan. 2, 1923.

1,440,845

UNITED STATES PATENT OFFICE.

OSCAR SODERSTROM, OF PLAINVILLE, MASSACHUSETTS, ASSIGNOR TO WHITING & DAVIS COMPANY, A CORPORATION OF MASSACHUSETTS.

MACHINE FOR CUTTING LINK MESH.

Application filed June 8, 1921. Serial No. 475,850.

*To all whom it may concern:*

Be it known that I, OSCAR SODERSTROM, a citizen of the United States, residing at Plainville, in the county of Norfolk, State of Massachusetts, have invented certain new and useful Improvements in Machines for Cutting Link Mesh; and I do hereby declare the following to be a full, clear, and exact description of the invention, such as will enable others skilled in the art to which it appertains to make and use the same.

This invention relates to machines for cutting link mesh fabric and is directed to the provision of a machine which is simple in construction and easily operated and which is adapted for cutting a piece of link mesh fabric along the line of one of the rows of the fabric.

A machine constructed in accordance with the invention consists essentially of a cutter for cutting links of the fabric and devices for feeding the fabric to the cutter in such a way as to cause the fabric to be cut along the line of one of the rows of links. The cutter may be of any suitable form, such for instance as a rotary cutter or saw actuated by an appropriate driving mechanism. To facilitate the positioning of the mesh for cutting and to serve as a guide during the cutting operation, the machine includes a support or table over which the mesh is moved to advance it to the cutter. The mesh upon this support or table is engaged by a suitable feeding mechanism for feeding it along over the surface of the table in such a way as to insure that the cutter will engage and cut the links of one row only without imposing any appreciable strain upon the links of other rows of the fabric. Preferably this feeding means consists of a pair of toothed feeding wheels lying side by side and on opposite sides of the plane of the cutter, with the teeth of the wheels spaced in correspondence with the spacing of the rings of the mesh fabric to be operated upon.

In the preferred embodiment of the invention, the machine is designed for use particularly in slitting or cutting open a sleeve of link mesh fabric produced by machines for making link mesh such as are illustrated and described in Letters Patent Nos. 948,615 and 1,144,724 granted February 8, 1910 and June 29, 1915 respectively to A. C. Pratt. For this purpose the machine includes a support for a sleeve of link mesh which is preferably of increasing width toward the feeding and cutting mechanisms to adapt it for spreading out and flattening the mesh. The cutter is preferably in the form of a circular saw and to facilitate positioning the piece of mesh upon the support the feeding devices which cooperate with the mesh are preferably arranged so that they may be moved away from the support to an inoperative position and return to the operative position after the mesh has been laid properly upon the support.

The invention is illustrated in the accompanying drawings, in application, as an example, to a machine for cutting open a sleeve of link mesh fabric, in which, Figure 1 is a side view in elevation of the machine;

Figure 2 is an end view in elevation of the machine;

Figure 3 represents a sleeve of link mesh fabric partly cut open, and

Figure 4 is a view along the line 4—4 of Figure 1.

The table 5 of the machine, for supporting a sleeve of link mesh 6, is mounted on a standard 7 and may, as shown in Figure 1, be inclined downwardly toward the cutting and feeding mechanism of the machine to facilitate the feeding of the link mesh to the cutter. The end of the table 5 over which the sleeve of link mesh is drawn, is narrowed and rounded as indicated at 8, and its upper surface is flattened. The opposite end of the table 5 is curved downwardly, as indicated at 9, to assist in carrying the link mesh past the cutting mechanism.

The cutter 10 of the machine consists of a circular saw which is mounted on a power shaft 11 having at its end a pulley 12 connected by a belt 13 to power. The shaft 11 is journaled in bearings 14 in the frame 15 of the machine and in a bearing 16 in the standard 17. Keyed to the shaft 11 is a worm 18 in mesh with a gear 19 on shaft 20 which is journaled in bearing 21 at the upper end of the standard 22. The shaft 20 carries a worm 23 which meshes with a worm wheel 24. The worm wheel 24 is mounted on a shaft 25 supported in a bearing 25' formed in the frame 17. At the upper end of the shaft 25 is a bevel gear 26 in mesh with a similar bevel gear 27. The gear 27 is secured to the end of a shaft 28 which is journaled in bearings 29 on the yoke 30. Mounted on the shaft 28 is a pair of feed wheels 31 having serrated or toothed peripheries and, as shown in Figure 2, these feed wheels are positioned within the yoke 30 and are spaced apart and supported laterally by a bushing 32 between the arms of the yoke. Formed at the outer ends of the arms of the yoke 30 are sleeve members 33 by which the yoke is pivotally mounted on the shaft 11. The yoke is provided with a handle 34 by which it may be swung about the shaft 11 to advance the feed wheels 31 to operative position on the table 5, as shown in Figure 1, and to retract them to inoperative position out of the way of the mesh fabric. In order to lock the yoke 30 in the position in which the feed wheels 31 are in operative position on the table 5, a pin 35 is provided for insertion in the opening 36 in bearing 14 and a corresponding opening 37 in the boss 38, with which the adjacent sleeve member 33 is provided, and which is in registry with the opening 36 in this position of the yoke. Before the yoke can be swung backwardly from the position shown in Figure 1 to retract the feed wheels to an inoperative position and out of the way of the link mesh, not only must the pin 35 first be removed, but it is also necessary to disengage the pinions 26 and 27. For this purpose the sleeve 39 on which the pinion 27 is mounted is provided with a cam slot 40, and the shaft 28 with a pin 41 projecting outwardly into the cam slot. The sleeve has a handle 42 by which it may be rotated about the shaft 28 counter to the direction in which the shaft is normally driven. When so rotated about the shaft the cam curve 40 and pin 41 cooperate to force the sleeve 39 inwardly along the shaft 28, thus carrying the bevel gear 27 out of engagement with the gear 26. In the normal driving position, as shown in Figure 2, the pin 41 is at the end of the cam slot and furnishes the connection between the sleeve 39 and the shaft 28.

The operation of the machine is as follows:—

The sleeve of link mesh fabric 6 is drawn over the end 8 of the table 5 and is spread open by the table as indicated in Figure 1. The fabric is then pulled down on the table to a position where it will be engaged by the feed wheels 31, which during this manual adjusting operation are thrown back in inoperative position. The yoke 30 is then thrown forward by means of the handle 34 to bring the feed wheels 31 into engagement with the link mesh fabric on the table in which position the yoke 30 is locked by the pin 35 inserted in the openings 36 and 37, which are then in registry. The gears 26 and 27 are next brought into engagement by throwing over the sleeve 39 by means of the handle 42 by which operation the sleeve 39 is advanced or moved outwardly along the shaft 28 by the action of the cam slot 40 and pin 41. As soon as the gears 26 and 27 are brought into mesh the shaft 28 is actuated, thus rotating the feed wheels 31, as shown in Figure 4. The feed wheels engage two rows of links A, and as they rotate the sleeve of link mesh fabric is drawn downwardly over the table and passes to the downwardly curved portion 9 thereof in contact with the cutter 10. The table 5 is provided with a slot 43 to receive the saw toothed peripheral edge of the cutter 10 and as the link mesh fabric passes downwardly over the portion 9 and into contact with the cutter 10 the latter comes into engagement with the links in the row B located between the rows of links A, thus cutting through the row B and opening up the sleeve of link mesh. After being cut the mesh fabric passes below the cutter 10 and may be collected in any suitable receptacle placed underneath the end of the table.

I claim:—

1. In a machine for cutting link mesh, means for cutting a piece of link mesh fabric along the line of one row of links, and means for feeding the fabric to said cutting means.

2. In a machine for cutting link mesh, a support for a piece of link mesh fabric, a cutter, mechanism for actuating the cutter, and means cooperating with the support for engaging the links of the fabric to feed to the cutter a row of links to be severed.

3. In a machine for cutting link mesh, a support for a piece of link mesh fabric, a rotary cutter, mechanism for driving the cutter, and means cooperating with the support for engaging the links of the fabric to feed to the cutter a row of links to be severed.

4. In a machine for cutting link mesh, a support for a piece of link mesh fabric, a rotary cutter, mechanism for driving the cutter, and means cooperating with the support, comprising a feed wheel having peripheral teeth, for engaging the links of one row to feed to the cutter the links of the row to be severed.

5. In a machine for cutting link mesh, a support for a piece of link mesh fabric, a cutter, mechanism for actuating the cutter, means cooperating with the support, comprising a pair of feed wheels positioned on opposite sides of the cutter and having peripheral teeth for engaging links of two rows, to feed to the cutter a row of links to be severed intermediate said rows engaged by the feeding means.

6. In a machine for cutting link mesh, a support for a piece of link mesh fabric, a rotary saw, mechanism for driving the saw, means cooperating with the support, comprising a pair of feed wheels positioned on opposite sides of the cutter and having peripheral teeth for engaging links of two rows, to feed to the cutter a row of links to be severed intermediate said rows engaged by the feeding means.

7. In a machine of the character described, a support for a sleeve of link mesh fabric, a circular saw, mechanism for driving the saw, means for advancing and retracting the saw to operative and inoperative positions, a pair of wheels having peripheral teeth for engaging links of two rows, one on each side of the row to be severed, to feed the latter to said saw, and mechanism for rotating said wheels and said saw.

In testimony whereof I affix my signature.

OSCAR SODERSTROM.